June 1, 1943.  E. MUELLER  2,320,377
DIAMOND CUTTING AND POLISHING MACHINE
Filed Jan. 31, 1942   5 Sheets-Sheet 2

INVENTOR.
Erhard Mueller
BY
ATTORNEY

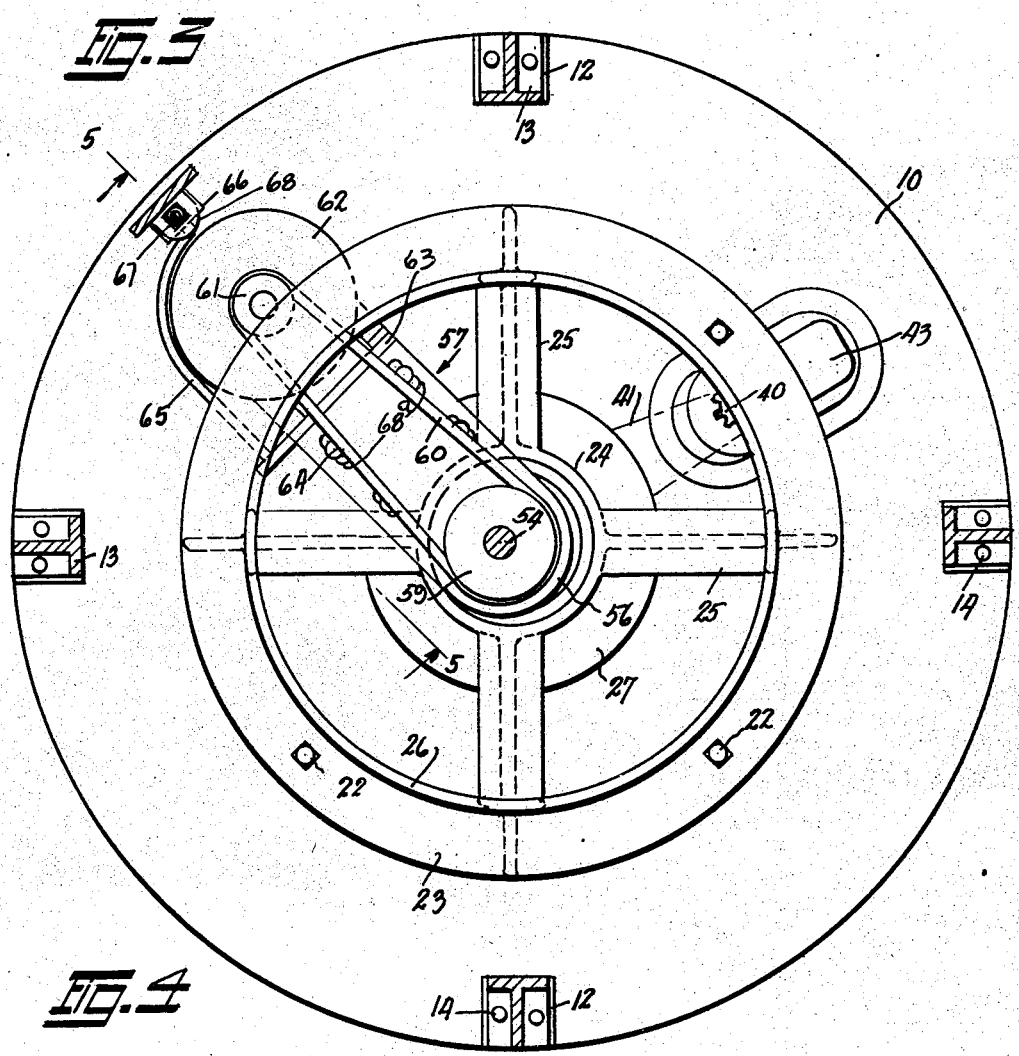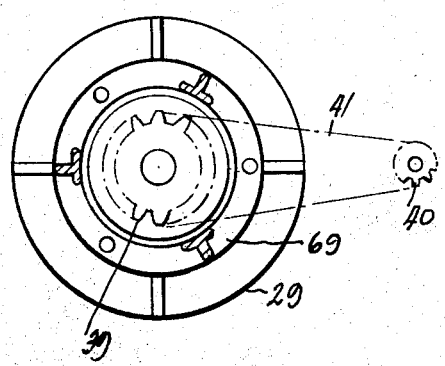

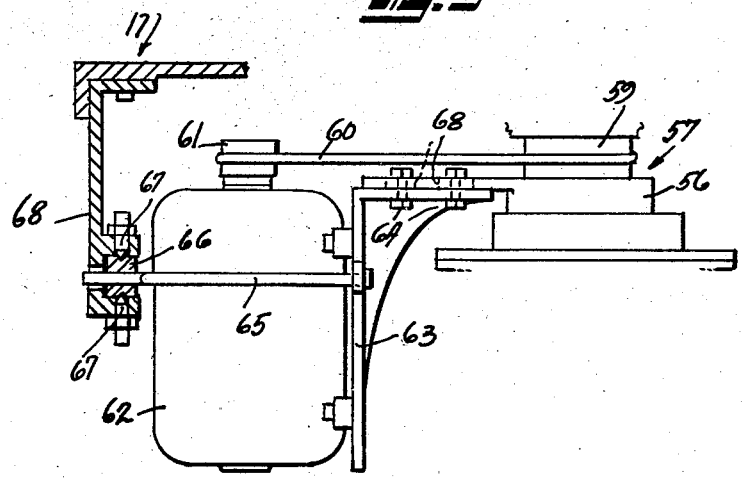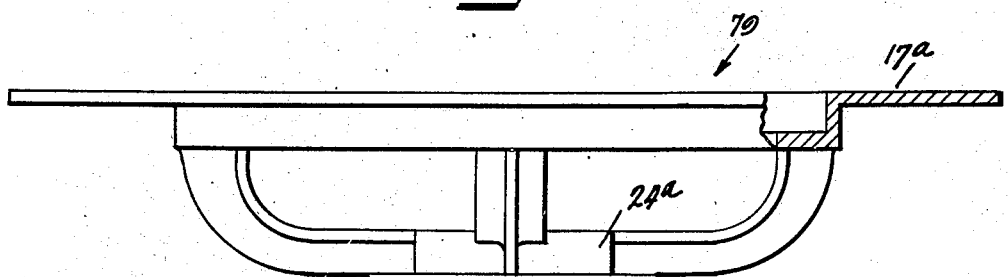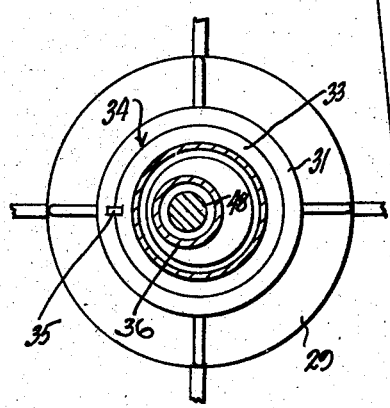

June 1, 1943.  E. MUELLER  2,320,377
DIAMOND CUTTING AND POLISHING MACHINE
Filed Jan. 31, 1942  5 Sheets-Sheet 5

INVENTOR.
Erhard Mueller
BY
ATTORNEY

Patented June 1, 1943

2,320,377

UNITED STATES PATENT OFFICE 2,320,377

DIAMOND CUTTING AND POLISHING MACHINE

Erhard Mueller, New York, N. Y., assignor to Harry Winston, Inc., New York, N. Y., a corporation of New York Application January 31, 1942, Serial No. 429,014

10 Claims. (Cl. 51—120)

This invention relates to diamond cutting and polishing machines of the type in which the work is held at one end of a work holder and is simultaneously cut and polished by means of a cutting disk having a rotary oscillating movement, the said work holder being pivotally mounted at one end on a table and carrying the work to be cut and polished at its opposite end against the surface of said disk.

One object of the invention is the provision of a machine of this nature in which the vertical axis of the cutting disk or its mounting is at all times at right angles to the top surface of the work carrying arm table as well as to the top surface of the said cutting disk.

Another object of the invention is the provision of a machine of this nature having a base plate which will tend to prevent any relative angular dislocation between the work table and cutting disk due to irregularities in the floor upon which the machine rests.

A further object of the invention is the provision of a machine of the character referred to having a cutting disk carried at one end of a shaft, the said shaft being eccentrically mounted in a rotatable sleeve carried in a housing vertically slidable in a bearing which is so connected to the work table as to insure perpendicular or right angular alinement therewith at all times.

A still further object of the invention is the provision of a machine of this nature which is easily assembled and disassembled, so that the machine may be shipped from the factory to its destination either fully or partially assembled.

Another object is to produce a device of the character described in which the maximum simplicity of construction and operation is secured.

Other objects and advantages will appear as the nature of the improvements is better understood, the invention consisting substantially in the novel arrangement and co-relation of parts herein fully described and illustrated in the accompanying drawings, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purpose of illustration, is shown in the accompanying drawings, in which Figure 1 is a longitudinal sectional view of a diamond cutting and polishing machine made in accordance with my invention;

Figure 3 is a sectional view taken on line 3—3 Figure 1;

Figure 4 is a sectional view taken on line 4—4 Figure 1;

Figure 5 is a fragmental side view partly in section looking in the direction of the arrows line 5—5 Figure 3;

Figure 6 is a fragmental sectional view taken on line 6—6 Figure 1;

Figure 9 is a side elevation showing the work table and housing bearing as integral.

Figure 1:
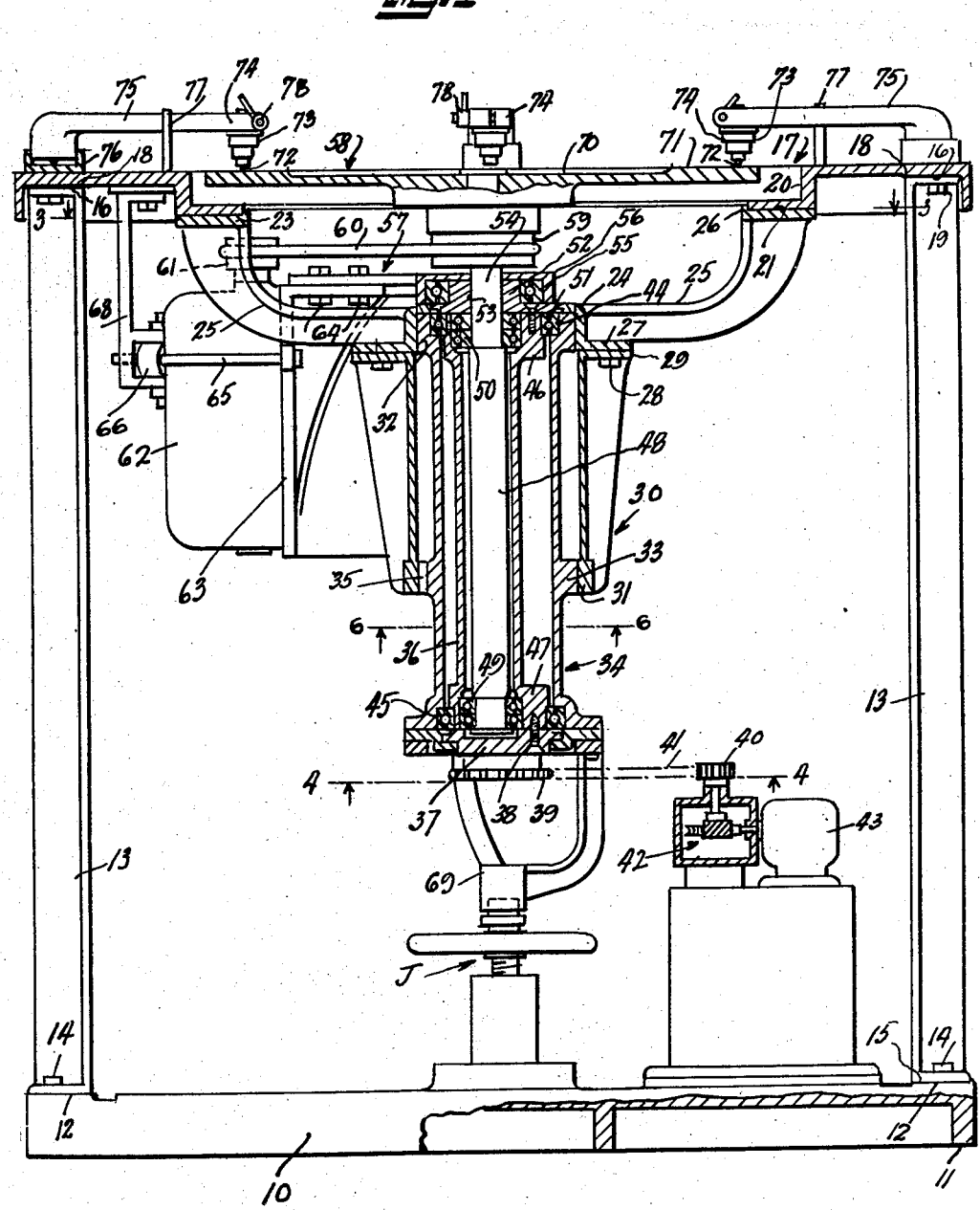

In machines of this nature accurate results are essential, such results however are only obtainable if the right angular relation between the vertical and horizontal axis of the machine is not disturbed. Inasmuch as due to various reasons irregularities often exist in floors, thus causing relative misadjustment between the different parts of ordinarily constructed machines supported on such floors, I have so constructed my improved diamond cutting and polishing machine as not to be affected by the condition of the floor upon which it rests.

Referring now to the drawings in detail the numeral 10 indicates a base plate whose floor contacting surface 11 is substantially smooth and even and which may be provided with pads having machined surfaces 12 to which are secured legs 13 by means of screws or bolts 14. The legs 13 are provided with lower finished surfaces 15 and upper finished or machined surfaces 16. Resting upon the legs 13 is a table 17 having machined pads 18 in contact with the machined surfaces 16, screws or bolts 19 securing the said table to the legs. The said table 17 may be provided with a depressed annular portion 20 whose bottom surface 21 is preferably machined and to which may be secured by means of screws or bolts 22 the upper annular base 23 of an upper bearing portion 24. The bearing portion 24 is connected to the annular base 23 by means of ribbed webs 25 and the base 23 may be provided with an upstanding flange 26 for centrally locating itself with respect to the table 17. The bearing 24 is further provided with an annular flange 27 to which may be secured by means of screws or bolts 28 the upper annular flange 29 of a lower bearing portion 30 having a bearing ring 31 at its lower extremity.

The upper and lower bearing rings 24 and 31 respectively engage the machined annular bosses 32 and 33 of a housing 34 which is adapted to slide up and down in the said bearing rings, a key 35 preventing relative rotary movement between the said housing and bearings. Located within the housing 34 is a sleeve 36 to the bottom of which is secured a disk or the like 37 by means of one or more screws 38. The said disk 37 carries a sprocket wheel 39 driven from a sprocket pinion 40 by a sprocket chain 41. The pinion 40 may be driven by means of a worm and worm wheel drive 42 in connection with an electric motor 43. The speed at which the sleeve 36 is driven by the connections just described is preferably ten revolutions per minute. An upper ball bearing 44 and a lower ball bearing 45 may be provided between the housing 34 and upper and lower bosses 46 and 47 respectively, said bosses being eccentric with the sleeve 36, the said ball bearings revolving at the same speed as the sleeve.

A shaft 48 eccentrically mounted with respect to the bosses 46 and 47 passes through the sleeve 36 and is provided with a thrust ball-bearing 49 at the bottom thereof as well as upper ball bearings 50. The ball bearings 44 and 50 are held in place by means of a plate 51 secured to the boss 46. The plate 51 is provided with a hub 52 and a bore 53 through which the reduced upper end 54 of the shaft 48 rotatably passes. A ball bearing 55 encircles the said hub 52 and is in turn encircled by a hollow hub or boss 56 of a bracket 57. The speed or rotation of the ball bearings 50 and 55 like the speed of the ball bearings 44 and 45 is ten R. P. M. Secured to the extreme upper end of the shaft 48 is a diamond cutting and polishing disk 58. The shaft 48 carries a pulley 59 which is connected by means of a belt 60 to a smaller pulley 61 driven by a motor 62. The rate of speed at which the shaft 48 is rotated is preferably eleven hundred revolutions per minute.

The motor 62 is secured to a bracket 63 which in turn is adjustably secured by bolts 64 to the bracket 57. A bent rod 65 extends from the bracket 63 and freely passes through a collar 66 pivotally mounted at 67—67 in a bracket 68 secured to the table 17. The adjustable mounting of the 63 with respect to the bracket 57 includes slots 68a in the bracket 57 (see Figs. 3 and 5) and provides means for taking up any slack in the belt 60. It will be seen that due to the manner of supporting the motor 62 the same will oscillate or reciprocate with the shaft 48 but will not rotate therewith as the rod 65 is free to slide in the collar 66 and the said collar swings on its pivots 67.

The cutting and polishing table 58 may be adjusted either upwardly or downwardly by means of a screw jack J in engagement with a member 69 which is secured to the housing 34 in which the sleeve 36 and the shaft 48 is supported. The said cutting disk or table 58 is provided with a central depression 70 so as to provide an annular cutting area 71 at the periphery of the said disk, the said disk being made of any suitable material impregnated with diamond dust.

Figure 2:
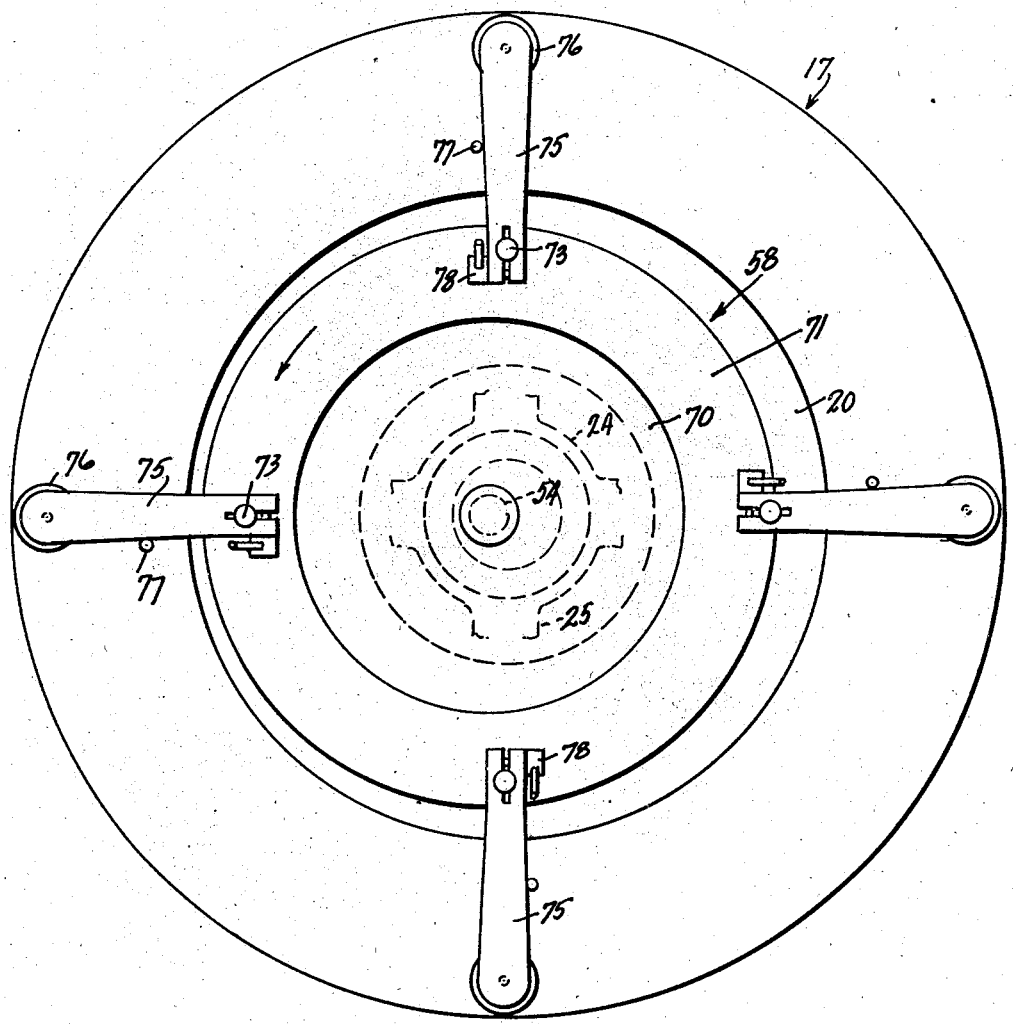
Figure 2 is a top plan view thereof.
Figure 7:
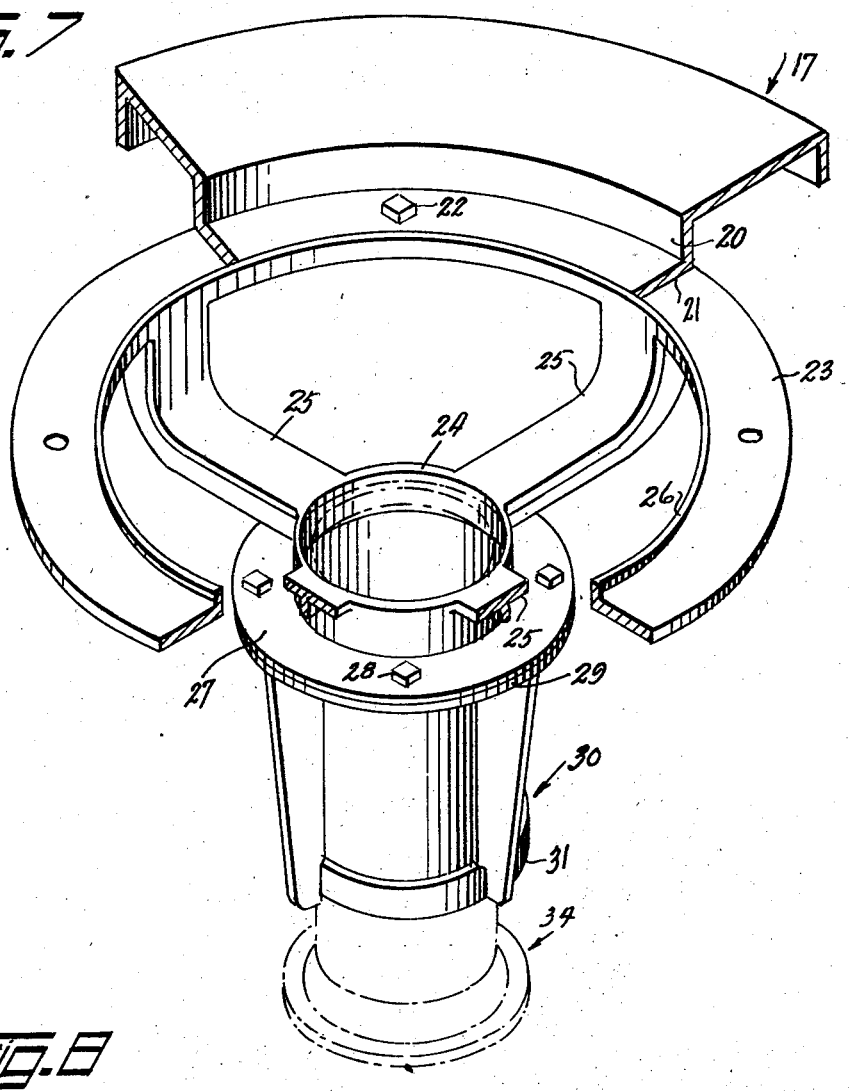
Figure 7 is a perspective view partly broken away of the work table and slidable housing bearing.
Figure 8:
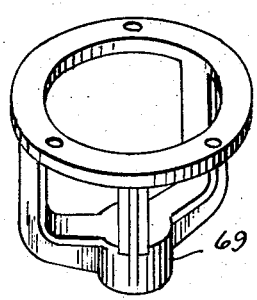
Figure 8 is a perspective view of the slidable housing supporting member.

The diamonds or other stones 72 to be polished may be suitably held in dops 73 (see Figures 1 and 2) maintained in the forward split end 74 of arms 75 pivotally supported in cupped supports 76 secured to the table top 17. Pins 77 in engagement with the work arms 75 prevent any swinging tendency of the said arms in the direction of rotation of the cutting disk 58. It will be understood that due to the rotary and oscillating movement of the cutting disk the diamonds are simultaneously cut and polished. It will also be seen that due to this combined movement of the cutting disk and the difference in speed of the disk carrying shaft 48 and the sleeve 36 any rutting tendency of the said cutting disk is reduced to a minimum.

In actual practice means is provided for automatically raising the arm 75 after the cutting and polishing of any surface is completed, but inasmuch as the present invention does not relate to this feature, same has not been shown nor described. By manipulating the clamp screw 78 the split end 74 of the arm 75 may be loosened for the removal or insertion of any suitable type diamond carrying dop used in cutting and polishing any of various facets of the stone or the table thereof.

I desire it understood that while I have shown only four work carrying arms, any desired number within certain limits may be provided, the said number depending upon the size or diameter of the table top 17 and the cutting disk 58.

In Figure 9 of the drawings I have shown a casting 79 which includes a unitary or integral combination of the table top 17a and bearings 24a and 31a elements correspond to the table top 17, upper bearing 24 and lower bearing 31 previously described in which the housing 34 is slidably maintained. With the use of this combination casting a great deal of machining of surfaces is avoided.

Attention is called to the fact that by the removal of the cutting disk 58 and the motor carrying bracket 57 the housing 34, sleeve 36, shaft 48 and sprocket wheel 39 may be readily withdrawn downwardly as a unit from the bearings 24 and 30 after also removing the supporting member 69.

From the foregoing it will be seen that I have provided a diamond cutting and polishing machine having means for effectively maintaining a right angular relation between the vertical axis of the cutting and polishing disk and the table top surface upon which the work carrying arms are suitably mounted.

It will further be seen that I have provided such a machine which may be readily assembled or disassembled and that same may be shipped from the factory to its destination either fully or partially assembled.

Having described my invention what I claim as new and desire to secure by Letters Patent is:

1. In a machine of the nature described, a base, a table above and spaced from the base, legs secured at one end to the base and at the opposite end to the table, a flange depending from the said table, a bearing structure suspended from the said flange, a housing vertically slidable in the said bearing structure, a sleeve rotatably and eccentrically mounted in the said housing, a shaft rotatably mounted in the said sleeve, a cutting disk carried on the said shaft at right angles to the vertical axis of the said shaft and parallel to the said table, means for driving said shaft, and means secured to the housing for raising or lowering same and carry the sleeve, shaft and the cutting disk therewith.

2. In a machine of the nature described, a base, a table above and spaced from the base, legs secured at one end to the base and at the opposite end to the table, a flange depending from the said table, a bearing structure suspended from the said flange, a housing vertically slidable in the said bearing structure, a sleeve rotatably and eccentrically mounted in the said housing, a shaft rotatably mounted in the said sleeve, a cutting disk carried on the said shaft at right angles to the vertical axis of the said shaft and parallel to the said table, means for driving said shaft, said means comprising a plate mounted on the shaft and secured to the sleeve to rotate therewith, a member resting upon said plate and provided with an opening through which the shaft passes, an electric motor carried by the said member, a stationary support, a collar pivotally mounted thereon, a rod secured to the said member and passing freely through the said collar, a pulley on the shaft, a pulley on the motor, and a belt connecting the said pulleys.

3. In a machine of the nature described, a horizontal work-carrying arm table, an upper and lower bearing structure depending from the said table, a vertically slidable housing in the said bearing structure, a shaft rotatably and eccentrically carried in said housing, a cutting disk carried on the said shaft at right angles to the vertical axis of the said shaft and parallel to the said table, means for driving said shaft, said means comprising a bracket in cooperative engagement with the said shaft, an electric motor carried by said bracket, a stationary support, a collar pivotally mounted thereon, a rod secured to said bracket at one end and passing freely through the collar at the other end, a pulley on the motor, a pulley on the shaft, and a belt connecting the said pulleys.

4. In a machine of the nature described, a horizontal work-carrying arm table, an upper and lower bearing structure depending from the said table, a vertically slidable housing in the said bearing structure, a shaft rotatably and eccentrically carried in said housing, a cutting disk carried on the said shaft at right angles to the vertical axis of the said shaft and parallel to the said table, means for driving said shaft, said means comprising a bracket in cooperative engagement with the said shaft, an electric motor carried by said bracket, a stationary support, a collar pivotally mounted thereon, a rod secured to said bracket at one end and passing freely through the collar at the other end, a pulley on the motor, a pulley on the shaft, a belt connecting the said pulleys, and means secured to the housing for raising or lowering same and carry the sleeve, shaft and the cutting disk therewith.

5. In a machine of the nature described, a base, legs secured at their lower end to the said base, a work arm carrying table secured to the upper end of said legs, a central annular flange depending from said table, an upper bearing portion secured to the said flange, a lower bearing portion secured to the second bearing portion, a housing vertically slidable in the said bearings, a shaft suitably carried in said housing, a cutting disk carried on the said shaft at right angles to the vertical axis of the said shaft and parallel to the said table, means for driving said shaft, and means secured to the housing for raising or lowering same and carry the sleeve, shaft and the cutting disk therewith.

6. In a machine of the nature described, a base, legs secured at their lower end to the said base, a work arm carrying table secured to the upper end of said legs, a central annular flange depending from said table, an upper bearing portion secured to the said flange, a lower bearing portion secured to the second bearing portion, a housing vertically slidable in the said bearings, a shaft suitably carried in said housing, a cutting disk carried on the said shaft at right angles to the vertical axis of the said shaft and parallel to the said table, means for driving said shaft, said means comprising a bracket in cooperative engagement with the said shaft, an electric motor carried by said bracket, a stationary support, a collar pivotally mounted thereon, a rod secured to said bracket at one end and passing freely through the collar at the other end, a pulley on the motor, a pulley on the shaft, and a belt connecting the said pulleys.

7. In a machine of the nature described, a frame, a rotable shaft suitably supported therein, a diamond cutting disk carried on the said shaft, means for rotating said shaft, said means including a bracket loosely supported on the shaft and extending radially therefrom, a member depending from the said bracket, a motor secured to said member, a stationary support radially spaced from the shaft and carried by the frame, a collar pivotally mounted thereon, a rod secured at one end to the bracket member and passing freely through the collar at its opposite end, a pulley on the shaft, a pulley on the motor and a drive belt engaging said pulleys.

8. In a machine of the nature described, a stationary horizontal work-carrying arm table, an upper and lower bearing structure depending from the said table, a housing in the said bearing structure, a shaft rotatably carried in said housing, a cutting disk carried on the said shaft at right angles to the vertical axis of the said shaft and parallel to the said table, means for driving said shaft, said means comprising a plate mounted on the shaft and secured to the sleeve to rotate therewith, a member resting upon said plate and provided with an opening through which the shaft passes, an electric motor carried by the said member, a stationary support, a collar pivotally mounted thereon, a rod secured at one end to the said member and passing freely at its opposite end through the said collar, a pulley on the shaft, a pulley on the motor, and a belt connecting the said pulleys.

9. In a machine of the nature described, a stationary horizontal work carrying arm table, an upper and lower bearing structure depending from the said table, a vertically slidable housing in the said bearing structure, a sleeve eccentrically and rotatably carried in the said housing, a shaft rotatably carried in the said sleeve, a cutting disk, carried on the said shaft means for driving said shaft, said means comprising a plate mounted on the shaft and secured to the sleeve to rotate therewith, a member resting upon said plate and provided with an opening through which the shaft passes, an electric motor carried by the said member, a stationary support, a collar pivotally mounted thereon, a rod secured at one end to the said member and passing freely at its opposite end through the said collar, a pulley on the shaft, a pulley on the motor, and a belt connecting the said pulleys.

10. In a machine of the nature described, a base, a table above and spaced from the base, legs secured at one end to the base and at the opposite end to the table, a flange depending from the said table, a bearing structure suspended from the said flange, a housing vertically slidable in the said bearing structure, a sleeve rotatably and eccentrically mounted in the said housing a shaft rotatably mounted in the said sleeve, a cutting disk carried on the said shaft at right angles to the vertical axis of the said shaft and parallel to the said table, means for driving said shaft, said means comprising a plate mounted on the shaft and secured to the sleeve to rotate therewith, a member resting upon said plate and provided with an opening through which the shaft passes, an electric motor carried by the said member, a stationary support radially spaced from the shaft, a collar pivotally mounted on the said support and having a bore in radial alinement with the center of the said shaft, a rod secured at one end thereof to the said member and passing freely at its opposite end through the collar bore, and a belt and pulley drive connection between the motor and shaft.

ERHARD MUELLER.